US012663045B2

(12) United States Patent
Houdayer et al.

(10) Patent No.: US 12,663,045 B2
(45) Date of Patent: Jun. 23, 2026

(54) ROLLING BEARING COMPRISING TWO IDENTICAL RINGS

(71) Applicant: AKTIEBOLAGET SKF, Gothenburg (SE)

(72) Inventors: Christophe Serge Jean Yves Houdayer, Semblancay (FR); Yannick Sébastien Sarton, Luynes (FR)

(73) Assignee: AKTIEBOLAGET SKF, Gothenburg (SE)

( * ) Notice: Subject to any disclaimer, the term of this patent is extended or adjusted under 35 U.S.C. 154(b) by 42 days.

(21) Appl. No.: 18/779,438

(22) Filed: Jul. 22, 2024

(65) Prior Publication Data

US 2025/0035163 A1 Jan. 30, 2025

(30) Foreign Application Priority Data

Jul. 27, 2023 (DE) .......................... 102023207189.4

(51) Int. Cl.
*F16C 33/78* (2006.01)
*F16C 19/08* (2006.01)
*F16C 41/00* (2006.01)

(52) U.S. Cl.
CPC ........ *F16C 33/7886* (2013.01); *F16C 33/783* (2013.01); *F16C 33/7896* (2013.01);
(Continued)

(58) Field of Classification Search
CPC ...... F16C 19/08; F16C 33/768; F16C 33/783; F16C 33/7886; F16C 33/7896;
(Continued)

(56) References Cited

U.S. PATENT DOCUMENTS

2019/0242435 A1\* 8/2019 Baumann .............. F16C 41/004
2020/0011287 A1\* 1/2020 Hofmann .............. F03B 11/006
(Continued)

FOREIGN PATENT DOCUMENTS

EP 4390164 A1 6/2024
EP 4390166 A1 6/2024
(Continued)

OTHER PUBLICATIONS

Communication and Search Report from the British Patent Office dispatched Oct. 9, 2024 in application No. GB2407209.2.

*Primary Examiner* — Alan B Waits
(74) *Attorney, Agent, or Firm* — J-TEK LAW PLLC; Scott T. Wakeman; Mark A. Ussai

(57) ABSTRACT

A rolling bearing includes a first ring having a rolling ring and a first, split sealing ring with part rings including an end ring, and a second ring including a second rolling ring and a second sealing ring. Each part ring has one straight through hole along the longitudinal axis and located on a first diameter and a shouldered through hole along the longitudinal axis, each part ring between the rolling ring and end ring being an intermediate ring with a threaded hole along the longitudinal axis. Two intermediate rings are adjacent twin rings each including a shouldered through hole and a threaded hole separated by an angle and two straight through holes along the longitudinal axis, located on the first diameter and separated by the angle. A channel extends from the end ring toward the first rolling ring and delimited partly by the straight holes of the twin rings.

10 Claims, 4 Drawing Sheets

(52) U.S. Cl.
CPC ............ *F16C 19/08* (2013.01); *F16C 41/008* (2013.01); *F16C 2300/14* (2013.01)

(58) Field of Classification Search
CPC .......................... F16C 41/008; F16C 2300/14; F16C 2360/31; F16J 15/002; F16J 15/3252; F03D 80/70
See application file for complete search history.

(56) References Cited

U.S. PATENT DOCUMENTS

| | | | |
|---|---|---|---|
| 2021/0140482 A1 | 5/2021 | Capoldi et al. | |
| 2022/0196072 A1 | 6/2022 | Barciet et al. | |
| 2024/0200604 A1* | 6/2024 | Huot-Marchand | ..... F16C 19/08 |
| 2024/0200607 A1* | 6/2024 | Huot-Marchand | .. F16J 15/3268 |

FOREIGN PATENT DOCUMENTS

| | | | |
|---|---|---|---|
| EP | 4390167 A1 | 6/2024 | |
| GB | 2610469 A | 3/2023 | |

* cited by examiner

ROLLING BEARING COMPRISING TWO IDENTICAL RINGS

CROSS-REFERENCE

This application claims priority to German patent application no. 102023207189.4 filed on Jul. 27, 2023, the contents of which are fully incorporated herein by reference.

BACKGROUND OF THE INVENTION

The present invention relates to rolling bearings, more particularly to large diameter rolling bearings having an inner ring and an outer ring arranged concentrically about an axis of rotation running in an axial direction.

Such large diameter rolling bearings may be used for example in marine applications, for example in a tidal or marine turbine power station, or in a tunnel boring machine, or in a mining extraction machine, or in a wind turbine.

A large diameter rolling bearing generally comprises two concentric inner and outer rings, and at least one row of rolling elements, such as rollers or balls, arranged between the rings. The bearing also comprises seals disposed between the inner and outer rings to define a closed space inside which the rolling elements are arranged.

Large diameter rolling bearings are generally used in aggressive environments, especially in marine applications. Seals prevent exterior elements, such as dust, abrasive particles, water, and marine species, for example plankton and algae, from getting inside the bearing and damaging its components. Those exterior elements may also alter the seal itself, leading to a reduction in the seal service life.

Generally, a plurality of additional adjacent seals is provided on the bearing front side which is directly in contact with the aggressive environments, for example with the saltwater. These additional seals are fixed to a sealing ring of one of the inner and outer rings and comprise a sealing lip in sliding contact with a running surface of a sealing ring of the other ring. Hence, several adjacent closed outer chambers are delimited between the sealing lips of the adjacent seals.

If water starts to enter inside the rolling bearing, by first entering inside the first outer seal chamber, it is desired to prevent the water or pollution to move further inside the bearing until the rolling space. Water ingress can occur in most of the applications, but particularly for immerged applications such as in a tidal turbine.

In a general way, the sealing rings are designed to optimize sealing and to facilitate seal maintenance. Accordingly, in certain types of design, all or most sealing rings comprise one or many leakage test channels.

Prior to use of the rolling bearing, a leakage test channel enables testing of an arca where a seal is located. More precisely, a vacuum test is performed. This means that a fluid is introduced under pressure in the channel or, on the contrary, a depression is created in the channel by suction. Hence, the efficiency of the sealing members and the seals may be tested. The introduced or sucked fluid may be air, lubricant, coloured liquid, etc.

A closing plug may be attached at an inlet orifice and/or at an outlet orifice of the leakage test channel, by any appropriate means, for example by screwing. Preferably, the closing plug is made of transparent material to be able to visually detect the presence of contaminant fluid during an inspection of the rolling bearing. The closing plug may be recovered by potting material and embedded inside this material. Thereby, the associated thread of the closing plug is sealed.

The above-described bearing rolling bearing presented works satisfactorily, but has some drawbacks, as follows. The rolling bearing structure is complex, both regarding the manufacture of the elements and their assembly. The rolling bearing comprises many different parts, in particular with regard to the sealing rings. This results in other disadvantages, such as relatively high costs and a long assembly times.

SUMMARY OF THE INVENTION

It is an object of the present invention, among other things, to overcome these drawbacks. The present invention seeks to optimize the bearing structure by making it simpler. As a corollary, the present invention seeks to reduce manufacturing costs and assembly times.

The present invention relates to a rolling bearing comprising a first ring and a second ring capable of rotating concentrically relative to one another about a longitudinal axis, and at least one row of rolling elements arranged between first and second raceways of the first and second rings, the first ring comprising at least one first rolling ring provided with the first raceway and at least one first sealing ring secured to the first rolling ring, and the second ring comprising at least one second rolling ring provided with the second raceway and at least one second sealing ring secured to the second rolling ring, the first sealing ring of the first ring being formed as a split ring and comprising at least two part rings, the part ring farthest from the rolling ring being an end ring, all of the part rings having one straight through hole oriented along the longitudinal axis and located on a first diameter $\Phi$, each of the part rings having at least a shouldered through hole oriented along the longitudinal axis, each of the part rings between the first rolling ring and the end ring being an intermediate ring having at least a threaded hole oriented along the longitudinal axis.

Two of the intermediate rings are twin rings having the same design, each twin ring having at least one pair of holes comprising a shouldered through hole and a threaded hole, the shouldered through hole and the threaded hole being separated by a first angle $\alpha$, each twin ring having two straight through holes oriented along the longitudinal axis, the two straight through holes being on the first diameter $\Phi$ and being separated by the angle $\alpha$, the twin rings being adjacent, a channel delimited by straight through holes of part rings extending from the end ring toward the first rolling ring, one twin ring delimiting one straight through hole of the channel, the other twin ring delimiting another straight through hole of the channel.

When all part rings are in place, a shouldered through hole of one twin ring is next to a threaded hole of the other twin ring, and a straight through hole of the one twin ring is next to a straight through hole of the other ring. This happens regardless of the order of the twin rings in the assembly, because they each have two straight through holes. Whatever their order of assembly, the twin rings create a passage through them. In other words, the straight through holes are automatically aligned. The straight through holes are part of the channel. Because two sealing rings are identical, the necessary number of different ring types required to make the rolling bearing is reduced. The bearing structure is optimized, in the sense that it has been simplified. As a consequence, manufacturing costs and assembly times are reduced.

In one embodiment, for each twin ring, the shouldered through holes, the threaded holes and the straight through holes are located on the first diameter Φ. This minimizes the distance between the outside diameter and the inside diameter of the sealing ring. Consequently, the weight of the sealing ring is reduced. A resulting advantage is less material consumption.

A series of holes successively includes one of the two straight through holes, the other of the two straight through holes, a threaded hole, and a shouldered through hole. The series of holes enables inserting a screw for tightening the twin rings as close as possible to two aligned straight through holes. Accordingly, the contact between the rings at the level of the holes is more homogeneous. This strengthens the tightness of the channel.

One straight through hole and the threaded hole are separated by a second angle β. The second angle β, between the through hole and the threaded hole, can be equal to or different from the first angle α, between the two straight through holes or between the threaded hole and the shouldered through hole. This allows different configurations for the arrangement of the holes.

The value of the first angle α is preferably 3° and the value of the second angle β is also preferably 3°. With such angle values, the distribution of the holes is compact and increases the space available for other clamping screws of the rings.

The diameter of each straight through hole is 6 mm, the diameter of the threaded hole is 12 mm, and the two diameters of the shouldered through hole are 22 and 13 mm. As a result, visual inspection of the emptiness of the straight through holes is easy and the tightening of the rings is sufficiently strong.

Each threaded hole is a blind hole, which further improves the seal between the rings.

For each twin ring, an edge has a first mark at the level of one of the straight through holes, and a second mark at the level of the other of the straight through holes. Thus, it is easier to position the two rings relative to each other.

Each twin ring includes several pairs including a shouldered through hole and a threaded hole, the shouldered through hole and threaded hole being separated by the first angle α. This means that several screws are provided for tightening the rings on each other.

The first sealing ring of the first ring preferably includes five rings. With this number of rings, good results have been obtained.

BRIEF DESCRIPTION OF THE SEVERAL VIEWS OF THE DRAWINGS

The present invention and its advantages will be better understood by studying the detailed description of specific embodiment given by way of non-limiting example and illustrated by the appended drawings on which.

DETAILED DESCRIPTION OF THE INVENTION

Figure 1:
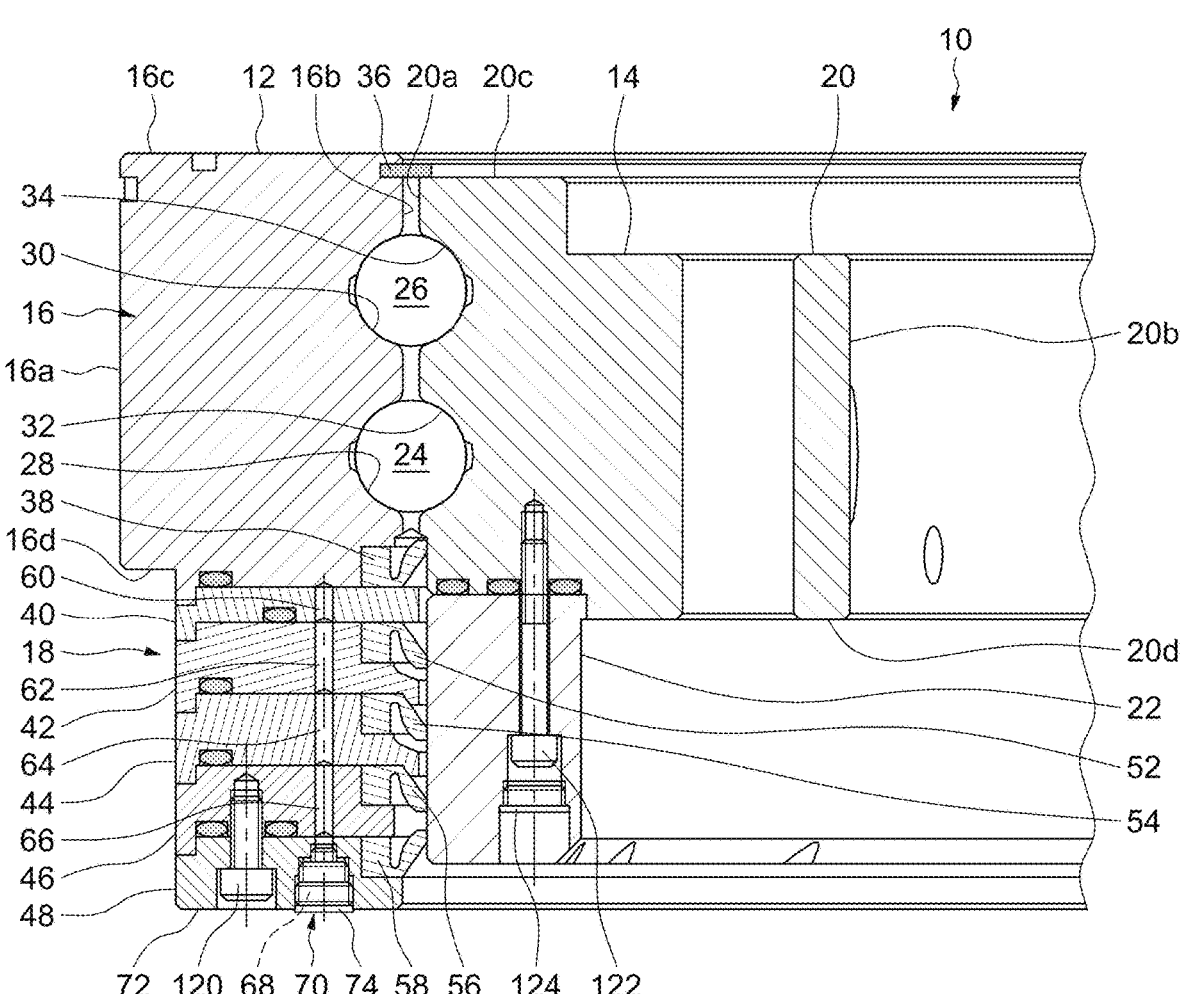
FIG. 1 is a partial cross-section of a rolling bearing, according to an example of the invention, in a cutting plane.
Figure 2:
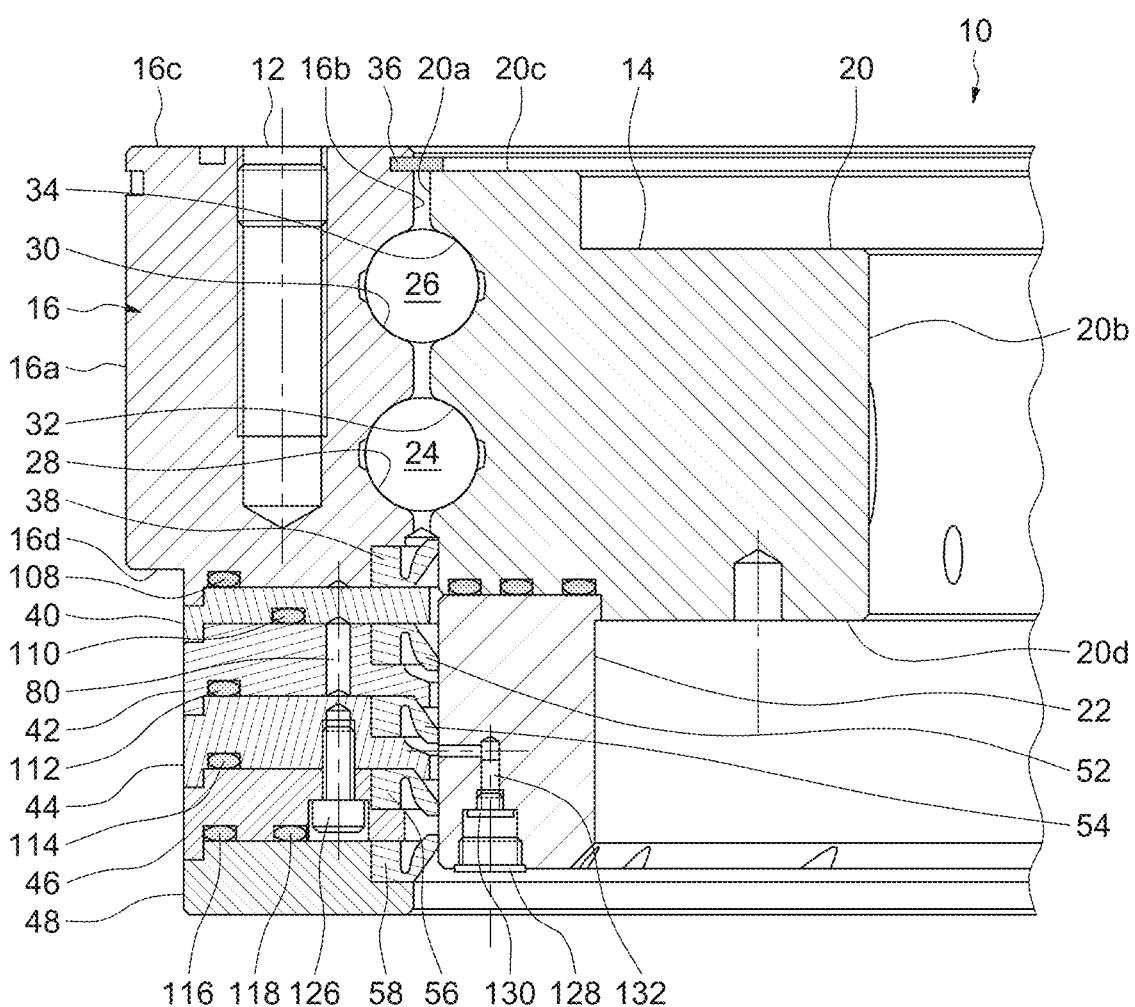
FIG. 2 is a partial cross-section of the rolling bearing of FIG. 1, in another cutting plane.

The rolling bearing 10 as illustrated in FIGS. 1 and 2 is a large diameter rolling bearing comprising a first ring 12 and a second ring 14. In the illustrated example, the first ring 12 is the outer ring whereas the second ring 14 is the inner ring. The rolling bearing may for example be used in a tidal or marine turbine power station a tunnel boring machine, a wind turbine, a big offshore crane, or any other applications using a large diameter rolling bearing.

The outer and inner rings 12, 14 are concentric and extend axially along the bearing rotation axis, not shown, which runs in an axial direction. In the illustrated example, the rings 12, 14 are of the solid type.

The first, outer ring 12 includes a rolling ring 16 and a sealing ring 18 secured to the rolling ring 16. The second, inner ring 14 also includes a rolling ring 20 and a sealing ring 22 secured to the rolling ring 20. The sealing ring 18 of the first, outer ring 12 radially surrounds the sealing ring 22 of the second, inner ring 14.

As described below, a plurality of successive seals is provided radially between the sealing rings 18, 22.

In the illustrated example, the rolling bearing 10 also comprises two rows of balls 24, 26 which are arranged between first raceways 28, 30 of the rolling ring 16 of the first, outer ring 12 and second raceways 32, 34 of the rolling ring 20 of the second, inner ring 14.

The rolling ring 20 of the second, inner ring 14 includes an outer cylindrical surface 20a from which the raceways 32, 34 are formed. The raceways 32, 34 are oriented radially outwardly. The rolling ring 20 also includes an inner cylindrical surface or bore 20b which is radially opposite to the outer surface 20a. The rolling ring 20 further includes two opposite first and second frontal surfaces 20c, 20d which axially delimit the outer surface 20a and the bore 20b. The frontal surfaces 20c, 20d delimit the axial thickness of the rolling ring 20.

The rolling ring 16 of the first, outer ring 12 includes an outer cylindrical surface 16a and an inner cylindrical bore 16b which is radially opposite to the outer surface 16a and from which the raceways 28, 30 are formed. The raceways 28, 30 are oriented radially inwardly. The rolling ring 16 further includes two opposite first and second frontal surfaces 16c, 16d which axially delimit the outer surface 16a and the bore 16b. The frontal surfaces 16c, 16d delimit the axial thickness of the rolling ring 16.

The rolling bearing 10 further comprises, axially on each side of the rolling rings 16 and 20, an annular seal 36, 38 mounted on the rolling ring 16 and provided to close or seal a radial space that exists between the rolling rings 16, 20. This radial space is defined between the bore 16b of the rolling ring 16 and the outer surface 20a of the rolling ring 20. An annular closed rolling space, not referenced, is defined between the rolling rings 16, 20 and the seals 36, 38 in which the rows of balls 24, 26 are housed. Advantageously, the rolling space is filled with lubricant, and the seals 36, 38 prevent grease leakage.

Each seal 36, 38 is mounted into a groove, not referenced, formed on the cylindrical bore 16b of the rolling ring 16 and contacts the rolling ring 20. The seal 38 contacts the outer surface 20a of the rolling ring 20 and the seal 36 contacts the frontal surface 20c of the rolling ring 20. Alternatively, it is possible to provide a reversed arrangement for at least one of the seals 36, 38 with the seals mounted on the rolling ring 20 and frictionally contacting the rolling ring 16.

The sealing ring 18 of the first, outer ring 12 is mounted axially into contact against the frontal surface 16*d* of the rolling ring 16. The sealing ring 18 protrudes axially with respect to the rolling ring 16. The sealing ring 18 is reversely attached or secured to the rolling ring 16. The sealing ring 18 radially surrounds the sealing ring 22 of the second, inner ring 14. Each of the sealing rings 18, 22 may be made of stainless steel or a steel treated by painting or with anti-corrosion treatment.

In the illustrated example, the sealing ring 18 is formed as a split ring and includes a first part ring 40, second part ring 42, third part ring 44, fourth part ring 46 and fifth part ring 48 stacked relative to each other in the axial direction. Alternatively, the sealing ring 18 may include more or less than five part rings. The fifth part ring 48 is an end ring, and the second part ring 42, the third part ring 44 and the fourth part ring 46 are intermediate rings.

The first part ring 40 is reversely secured to the rolling ring 16 by screws (not shown) spaced apart in the circumferential direction. The first part ring 40 axially abuts against the frontal surface 16*d* of the rolling ring 16. Similarly, the second part ring 42 is reversely secured to the first part ring 40 by screws, not shown, axially on the side opposite to the rolling ring 16. The third part ring 44 is reversely secured to the second part ring 42 by screws axially on the side opposite to the first part ring 40. The fourth part ring 46 is reversely secured to the third part ring 44 by screws axially on the side opposite to the second part ring 42. The fifth part ring 48 is reversely secured to the fourth part ring 46 by screws axially on the side opposite to the third part ring 44. The heads of the screws of the first part ring 40 may be covered by a potting material and embedded within such material. Thereby, the associated threads of the screws are sealed.

As previously described, a plurality of successive annular seals is provided radially between the sealing ring 18 of the first, outer ring 12 and the sealing ring 22 of the second, inner ring 14.

In the illustrated example, the rolling bearing 10 is provided successively with a first seal 52, second seal 54, third seal 56 and a fourth seal 58 supported by the sealing ring 18 of the first, outer ring 12. The sealing ring 18 bears the seals 52, 54, 56, 58 and these seals are arranged successively in the axial direction.

The successive first seal 52, second seal 54, third seal 56 and fourth seal 58 are respectively mounted on the second part ring 42, the third part ring 44, fourth part ring 46 and the fifth part ring 48 of the sealing ring 18. Thereby, the first seal 52 is axially located on the side of the first part ring 40, the fourth seal 58 is axially located on the side of the fourth part ring 46, and the second and third seals 54, 56 are axially disposed between the two seals 52, 58.

Each seal 52, 54, 56, 58 is provided with an annular heel and with an annular friction lip projecting from the heel, the heels and the lips not indicated. In the illustrated example, each friction lip extends inwardly from the heel.

The heel of each seal is mounted in axial and radial contact against the associated second part ring 42, third part ring 44, fourth part ring 46 and fifth part ring 48 of the sealing ring 18.

Each lip frictionally contacts the sealing ring 22 of the second, inner ring 14; specifically, the lips frictionally contacts the outer surface of the sealing ring 22. The contact between each lip and the sealing ring 22 is radial. The lips are flexible in the radial direction. Preferably, the free end of each lip has a triangular cross-sectional shape in order to reduce friction.

In the illustrated example, the seals 52, 54, 56, 58 are formed substantially identical to each other. Alternatively, the seals may be formed different from each other. In the illustrated example, the sealing ring 18 includes four seals 52, 54, 56, 58. The number of seals may be different. For example, the sealing ring 18 may include only two seals. Further, the seals 52, 54, 56, 58 may be fabricated of an elastomeric material, for example, polyurethane.

In a non-limiting manner, the first part ring 40 has a straight through hole 60, the second part ring 42 has a straight through hole 62, the third part ring 44 has a straight through hole 64, the fourth part ring 46 has a straight through hole 66 and the fifth part ring 48 has a shouldered through hole 68, a channel 70 being delimited or defined by the five holes 60, 62, 64, 66, 68, the five holes 60, 62, 64 and 68 being aligned (i.e., axially).

The channel 70 may be used for testing and, accordingly, may be in fluid communication or connection with chambers containing seal, such communication and the chambers not being described herein. The channel 70 enables the introduction of a pressurized fluid or the creation of a vacuum. Prior to use of the rolling bearing, the channel 70 may be used to introduce lubricant, preferably grease, inside the chambers. Such lubricant forms an additional barrier against the ingress of contaminants.

The shouldered through hole 68 is an inlet orifice of the channel 70, opening on an outer surface 72 of the sealing ring 18, which is also the outer surface of the fifth part ring 48.

The rolling bearing 10 also comprises a first closing plug 74 attached at the inlet orifice 68 of the channel 70. The closing plug 74 may be attached to the inlet orifice 68 by any appropriate means, for example by screwing. The closing plug 74 is made from any suitable material and prevents water ingress. In the illustrated example, the closing plug 74 does not axially protrude with respect to the sealing ring 48. The closing plug 74 may be covered by a potting material and embedded inside of this material. Thereby, the associated thread of the closing plug 74 is sealed.

Two of the intermediate rings 42, 44, 46 are twin rings having the same design; in other words, the twin rings have the same structure. In the illustrated example, the twin rings are the second part ring 42 and the third part ring 44, but the twin rings may alternatively be part rings 44 and 46.

Figure 3:
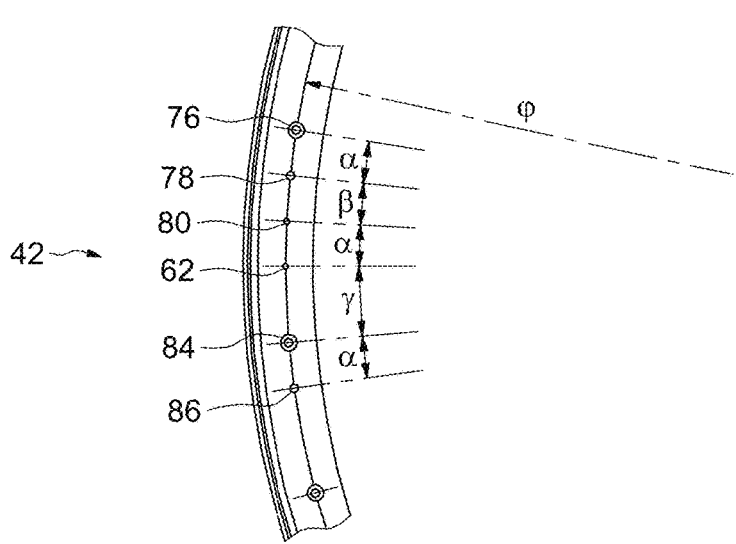
FIG. 3 is a partial flat view of a twin ring of the rolling bearing of FIG. 1.
Figure 4:
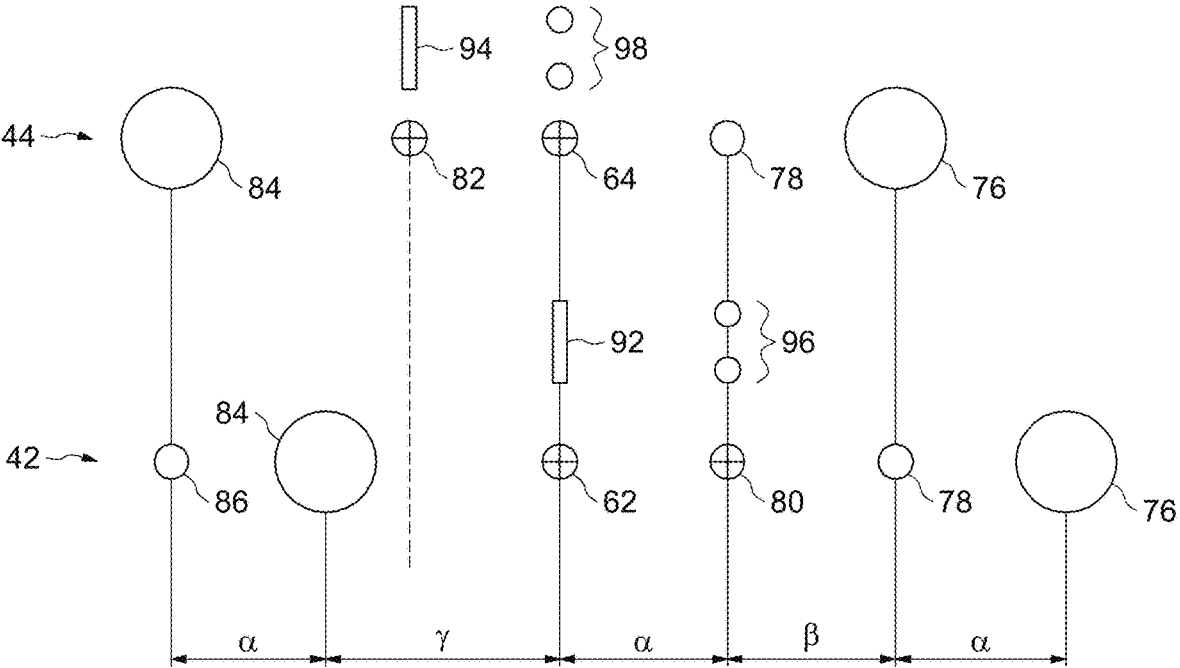
FIG. 4 is a diagram explaining the placement of two twin rings of the rolling bearing for the example according to FIG. 1.

As shown in FIGS. 3 and 4, each twin ring 42, 44 includes at least a shouldered through hole 76 and a threaded hole 78. The shouldered through hole 76 and threaded hole 78 are oriented along the longitudinal axis of the rolling bearing 10 and are located on a first diameter $\Phi$. The shouldered through hole 76 and threaded hole 78 are separated by a first angle $\alpha$. In a non-limiting way, the first angle $\alpha$ preferably has a value of 3°. Alternatively, the angle $\alpha$ may be lesser or greater than 3°.

The twin ring 42 has two straight through holes 62, 80 oriented along the longitudinal axis of the rolling bearing 10, and located on the first diameter $\Phi$. The holes 62, 80 are separated by the first angle $\alpha$. Again, the angle $\alpha$ preferably has a value of 3°, but may be lesser or greater. Nevertheless, the angle $\alpha$ between the shouldered through hole 76 and threaded hole 78 is the same as the angle $\alpha$ between the straight through holes 62, 80.

Similarly, the twin ring 44 has two straight through holes 82, 64 oriented along the longitudinal axis of the rolling bearing 10, and located on the first diameter $\Phi$. The holes 82, 64 are separated by the first angle α. Again, the value of the first angle α is 3° and could be more or less. Nevertheless, the angle α between the shouldered through hole 76 and threaded hole 78 is the same as the angle α between the straight through holes 82, 64.

Each twin ring 42, 44 has a series of holes successively including one 62, 82 of the two through holes 62, 82, another one of the through holes 80, 64, the threaded hole 78, and the shouldered through hole 76. The series of the two rings 42, 44 are oriented in the same direction. One straight through hole 80, 64 and a threaded hole 78 are separated by a second angle β, which may be equal to or different than the first angle α, between two straight through holes 62, 80 and 82, 64, or between the threaded hole 78 and the shouldered through hole 76. This allows different configurations for the arrangement of the holes.

As schematically shown in FIG. 4, when all the sealing rings 40, 42, 44, 46, 48 are assembled, the twin rings 42, 44 are offset by the value of the first angle α, i.e., by 3 degrees. In this case, one shouldered through hole 76 of one twin ring 44 is exactly in front of one threaded hole 78 of the other twin ring 42. Also, one straight through hole 64 of one twin ring 44 is exactly in front of one straight through hole 62 of the other ring 42. In other words, when the twin rings 42, 44 are secured to each other, they create a passage through them. The straight through holes 62, 64 are automatically aligned. When the relative position of the rings is reversed, one replacing the other, the same arrangement is achieved. The straight through holes 80, 82 are part of the channel 70. Because the two sealing rings 42, 44 are identical, the necessary number of different ring types required to make the rolling bearing 10 is reduced. The bearing structure is optimized in the sense of being simpler. As a consequence, the manufacturing costs and the assembly times are both reduced.

Referring again to FIG. 3, each twin ring 42, 44 includes several pairs comprising a shouldered through hole 84 and a threaded hole 86, the shouldered through hole 84 and the threaded hole 86 being separated by the first angle α. This enables a distribution of the tightening pressure to the periphery of the rings 42, 44. The shouldered through hole 84 and the straight through hole 62 are separated by an angle γ, which may have a value of between 3° and 10°.

Preferably, each threaded hole 78, 86 is a blind hole, which provides a better seal between the rings 42, 44.

Figure 5:
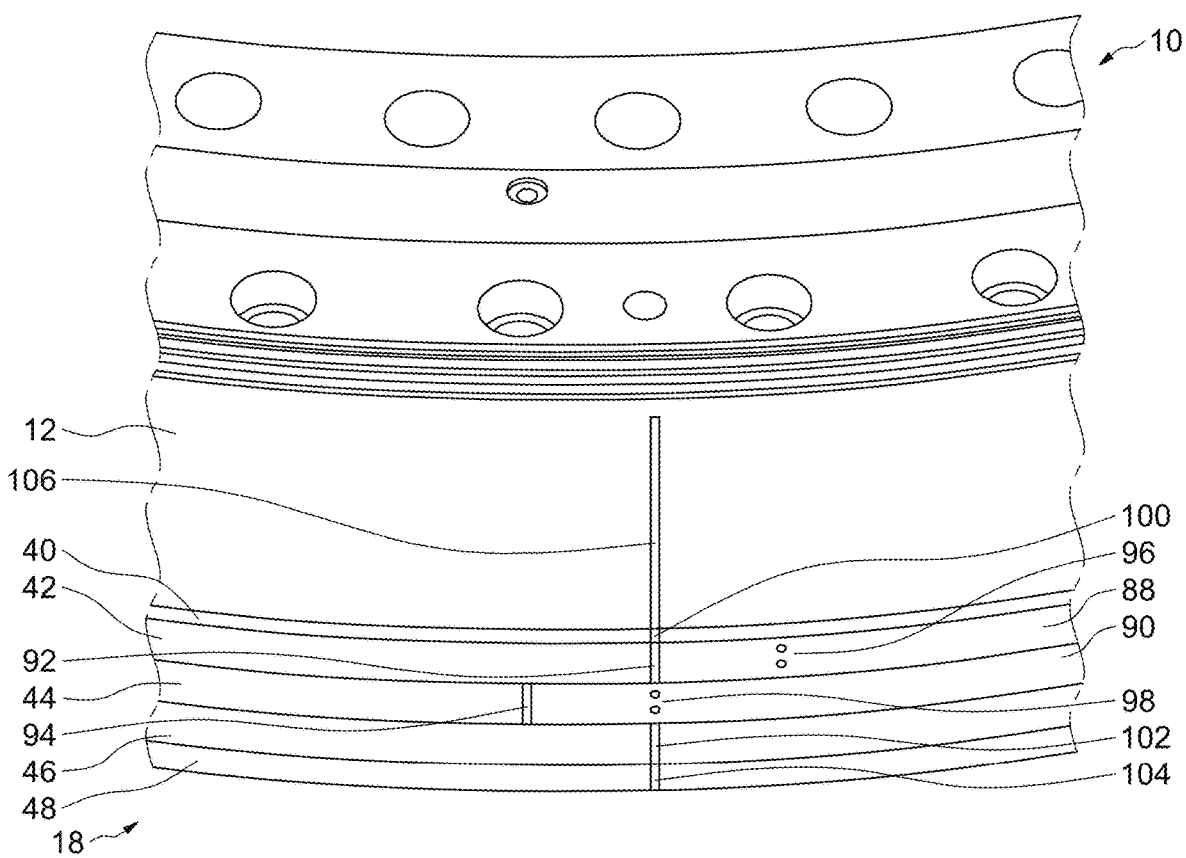
FIG. 5 is a partial perspective view of a rolling bearing according to FIG. 1.

Now in view of both FIGS. 4 and 5, for each twin ring 42, 44 has an edge 88, 90, respectively, with a first mark 92, 94, respectively, at the level of one of the straight through holes 62, 82, and a second mark 96, 98, respectively, at the level of the other of the straight through holes 80, 64. These marks 92, 94, 96, 98 helps to ensure proper relative placement of the twin rings 42, 44.

In the same spirit, the first part ring 40 has a mark 100, the fourth part ring 46 has a mark 102, the fifth part ring 48 has a mark 104, and the outer ring 12 has a mark 106. All of these marks are aligned when all of the rings are assembled.

Returning to the FIGS. 1 and 2, it is shown that the rings are secured two by two by means of screws. For example, screws 120 clamp the part ring 48 to the part ring 46. Screws 126 clamp the part ring 46 to the part ring 44. Also, screws 122 clamp the second sealing ring 22 to the inner ring 14 and the closing plugs 124 are attached at the inlet orifices for screws 122. A closing plug 128 is attached at the outlet orifice 130 of a purging channel 132 of the second sealing ring 22. The closing plug 128 may be attached to the outlet orifice 130 by any appropriate means, for example by screwing. Seals 108, 110, 112, 114, 116, 118 improve sealing of the first sealing ring 18.

Otherwise, as previously mentioned, in the illustrated example, the first ring 12 of the rolling bearing is the outer ring whereas the second ring 14 is the inner ring. As an alternative, it could be possible to provide a reversed arrangement in which the first ring 12 is the inner ring and the second ring 14 is the outer ring.

In the described example, the rolling bearing 10 comprises two rows of rolling elements 24, 26. Alternatively, the rolling bearing 10 may comprise only one row of rolling elements, or three or more rows of rolling elements. In the illustrated example, the rolling elements are balls. However, the rolling bearing 10 may comprise other types of rolling elements, for example cylindrical rollers, tapered rollers, needles, etc.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A rolling bearing having a longitudinal axis, the rolling bearing comprising:
  a first ring including at least one first rolling ring having at least one first raceway and at least one first sealing ring secured to the first rolling ring, the first sealing ring being formed as a split ring including at least three part rings, the part ring located farthest from the first rolling ring being an end ring, each one of the part rings having one straight through hole oriented along the longitudinal axis and located on a first diameter and at least one shouldered through hole oriented along the longitudinal axis, each one of the part rings located between the first rolling ring and the end ring being an intermediate ring having at least one threaded hole oriented along the longitudinal axis;
  a second ring including at least one second rolling ring having at least one second raceway and at least one second sealing ring secured to the second rolling ring; and at least one row of rolling elements arranged between the at least one first raceway of the first rolling ring and the at least one second raceway of the second rolling ring such that at least one of the first and second rings is capable of rotating concentrically relative to the other one of the first and second rings about the longitudinal axis;

wherein two of the intermediate part rings of the first sealing ring are twin rings being identically formed and being adjacent to each other, each twin ring having at least one pair of holes including a shouldered through hole and a threaded hole, the shouldered through hole and the threaded hole being separated by a first angle, each twin ring further having two straight through holes oriented parallel to the longitudinal axis, the two straight through holes being located on the first diameter and being separated by the first angle; and wherein a channel is delimited by the straight through holes of the part rings extending from the end ring towards the first rolling ring, one of the twin rings delimiting one straight through hole of the channel and the other twin ring delimiting another straight through hole of the channel.

2. The rolling bearing according to claim 1, wherein the shouldered through holes of each twin ring, the threaded holes of each twin ring and the straight through holes of each two ring are all located on the first diameter.

3. The rolling bearing according to claim 1, wherein a series of holes includes successively one of the two straight through holes, the other one of the two straight through holes, a threaded hole, and a shouldered through hole.

4. The rolling bearing according to claim 3, wherein one of the two straight through holes and the threaded hole are separated by a second angle.

5. The rolling bearing according to claim 4, wherein the first angle has a value of 3° and the second angle has a value of 3°.

6. The rolling bearing according to claim 1, wherein each straight through hole has a diameter of 6 mm, the threaded hole has a diameter of 12 mm, and the shouldered through hole has a one diameter of 22 mm and another diameter of 13 mm.

7. The rolling bearing according to claim 1, wherein each threaded hole is a blind hole.

8. The rolling bearing according to claim 1, wherein each one of the twin rings has an edge with a first mark at the level of one of the straight through holes and a second mark at the level of the other one of the straight through holes.

9. The rolling bearing according to claim 1, wherein each one of the twin rings includes several pairs of holes, each pair of holes including a shouldered through hole and a threaded hole, the shouldered through hole and the threaded hole being separated by the first angle.

10. The rolling bearing according to claim 1, wherein the first sealing ring of the first ring includes five rings.

* * * * *